May 28, 1968  H. W. RABINOWITZ ET AL  3,385,954
ELECTRICALLY HEATED WAX MELTING TOOL FOR ENCAUSTIC PAINTING
Filed Oct. 19, 1965  2 Sheets-Sheet 1

INVENTORS
HAROLD W. RABINOWITZ
MADELINE V. RABINOWITZ
BY
Steward & Steward

ATTORNEYS

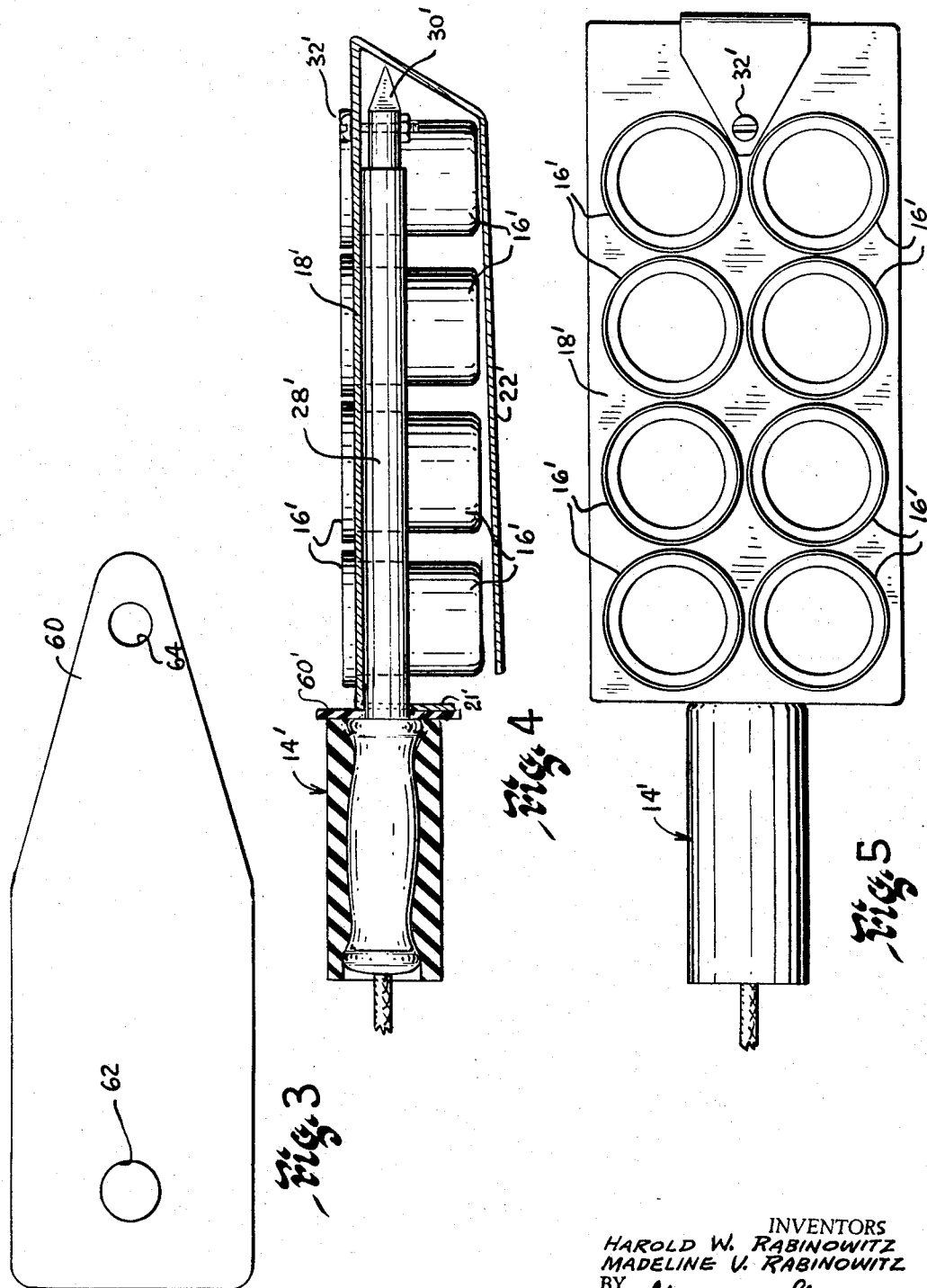

United States Patent Office 3,385,954
Patented May 28, 1968

3,385,954
ELECTRICALLY HEATED WAX MELTING TOOL
FOR ENCAUSTIC PAINTING
Harold W. Rabinowitz, and Madeline V. Rabinowitz,
both of Carmel Road, Bethany, Conn.
Filed Oct. 19, 1965, Ser. No. 498,007
6 Claims. (Cl. 219—421)

ABSTRACT OF THE DISCLOSURE

A tool for melting wax for batik and encaustic painting has a palette with removable wax melting cups combined with a wax dispensing pen. The palette and pen are heated by a single heating element. Wax of various colors is melted in the cups for application by brush or swab stick. Wax is also melted in the pen and dispensed through a valved spout in a smooth even line. A modified version of the tool includes only the palette portion. The heating element in both versions comprises a conventional electric soldering iron, the handle of which is used to manipulate the wax melting tool.

This invention relates to wax melting and applicating tools for use in artistic decoration work, as for example, in batik and encaustic painting, and it relates more particularly to a palette and a combination palette-and-pen for use in connection therewith.

An object of the invention is to provide a convenient device for melting different colored waxes so that these can be used as the decorating medium on various base materials including plastics, fabrics, wood, paper and metal of any shape or form. In fabric printing and decorating, the use of wax-melting tools of the present invention facilitate the heretofore somewhat tedious processes of batik craft and encaustic painting, and thereby make possible more exacting control of these techniques as well as making them more pleasant and interesting. As will be apparent from the detailed description hereinafter of certain practical forms of the invention shown herein for illustrative purposes, tools embodying the invention provide many advantages and capabilities for art work not afforded by the tools previously available for use in this art.

In general the invention resides in the concept of providing an art tool including a palette for melting and mixing colored waxes in which an elongated heating rod, such as that used in conventional pencil-type soldering irons, is mounted on the underside of a holder or panel apertured to receive and support a plurality of containers, such as metal cups, with the barrel of the heating unit extending between the containers and in contact therewith, as well as with the holder panel, so that heat is conducted uniformly to the containers as it rises by conduction and spreads out uniformly through the holder panel to the various containers. The containers are also heated by radiation from the heating element, thereby helping to maintain them at a uniform temperature. An insulated handle is provided at one end of the heating element by which to carry the tool. A wax dispenser or pen may also be mounted on the tool at the opposite end of the heating rod from the handle for use in drawing smooth lines of liquid wax.

The invention will be more fully understood from the description of certain specific embodiments thereof shown in the accompanying drawings, wherein:

FIG. 3 is a plan view of an elastic insulating cover for the underside of the tool in FIG. 1;

FIG. 4 is a view similar to FIG. 1 but showing a modified form of the invention; and FIG. 5 is a top plan view of the tool shown in FIG. 4.

Figure 1:
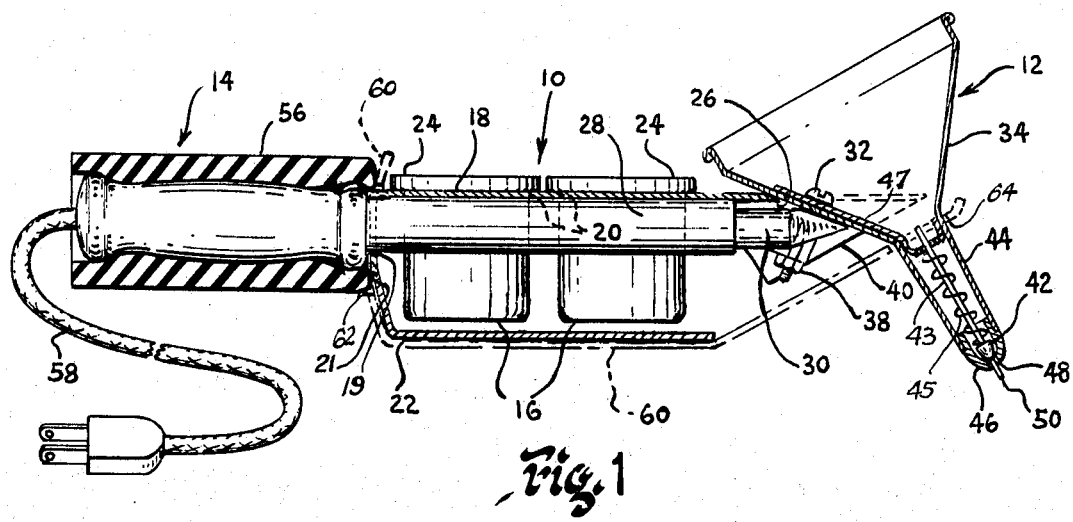
FIG. 1 is a central longitudinal section through a combination wax-melting and wax-applying tool embodying the invention.

Referring to the embodiment of the invention shown in FIGS. 1 and 2, the tool consists of three main parts, namely, a palette portion 10, a pen or wax applicator 12 mounted at the front end of palette 10, and a heating unit, as more fully described below, having a handle 14 by which to hold or manipulate palette 10 and pen 12. Palette 10 is formed of sheet metal having good heat conductivity and comprises a cup-holding upper panel 18 in which are removably supported several (in this case four) cup-shaped containers 16, likewise formed of good heat conducting material, in which the waxes to be melted are contained. The upper panel is provided with an appropriate number of relatively large circular openings 20 in which cups 16 are seated, and a prolongation of the sheet material is folded down and back under the cups to provide a rear wall 21 and a lower shield or stand 22 on which the palette may be rested. The upper edge of each cup 16 is flared outwardly to provide a lip 24 which engages the upper surface of panel 18 so that the melting cups seat snugly in their openings 20 but are readily removable therefrom.

The heating unit above mentioned comprises a standard low-wattage electric pencil-type soldering iron 28, the wooden handle of which forms the handle 14 for the palette. The barrel of the iron containing the usual resistance heating element projects through the rear fold or wall 21, through an aperture 19 provided in the wall for this purpose. The barrel of the iron extends forward between cups 16, in lateral contact therewith and with the undersurface of panel 18, in order to provide a good heat-transfer path to the cups. The entire palette portion 10 of the device is secured in position on the soldering iron by means of pen 12 which engages the forward edge of panel 18, forcing abutment of rear wall 21 against handle 14. Pen 12 is secured to the outer end of iron 28 by drilling a hole through the tip 30 of the iron and passing a fastening screw 32 through the side wall of the pan and through the hole in the tip. A nut 38 on screw 32 permits clamping of the parts together in good heat-transfer relation.

Pen 12 is conveniently formed in this instance of a metal funnel 34 which seats in a V-notch or saddle 26 formed in the front edge of panel 18 to allow the conical wall of the funnel to lie flat against the upper face of tip 30, also permitting the funnel to be tipped forwardly at an angle to the plane of panel 18 for convenience in applying wax to a surface in creating a design thereon. Corners 40 at either side of the forward extension of panel 18 are bent downwardly and slightly inwardly to provide protective wings at each side forming a shield about tip 30 of the iron.

In order to control the flow of melted wax from pen 12, a stylus is provided incorporating check valve 42 in the spout portion 44 of funnel 34. Spout 44 is provided with a hollow tip 46 which fits snugly in the lower end of the spout, and an aperture 48 is formed in tip 46 of suitable size to permit flow of molten wax therethrough. Valve 42 has a stem 43, and a spring 45 encircling the stem biases the valve normally to closed position. In order to support the upper end of the valve stem and form a stop for spring 45, a bracket 47 is secured under fastening screw 32 and extends downwardly along the wall of funnel 34 to terminate adjacent the upper end of spout 44. The lower end of bracket 37 is suitably apertured to receive the upper end of the valve stem as well as to allow molten wax to pass downwardly into the spout of the funnel. Bracket 47 permits adjustment in the amount of closing tension on spring 43 of the stylus by simply bending the lower tip of the bracket toward or away from the spring.

Control of the wax flow is effected by the projection of the lower end of the stem of valve 42 through aperture 48, thus forming a stylus tip 50 for contacting the surface to be decorated. Upon engagement of tip 50 with the surface, valve 42 is unseated, releasing molten wax through aperture 48. When pen 12 is lifted away from the surface, spring 43 reseats the valve to cut off further flow of the wax.

For added convenience and comfort in handling the art tool, handle portion 14 is desirably covered with a heavy sponge rubber grip 56. The heating unit or soldering iron 28 is of course provided with usual electric cord set 58 of suitable length for connection to a power outlet. Also, if desired, the entire underside of the palette pen may be enclosed within an insulating cover 60 shown in its developed form in FIG. 3. Such a cover is easily formed of heavy sheet rubber having a hole 62 of suitable size to fit over the barrel 28 of the heating unit whereby it may be clamped between rear wall 21 of palette portion 10 and the handle 14 of the heating unit. Cover 60 is also provided with a second hole 64 adjacent its forward or narrow end so that in assembling the cover to the device, after the rear end of the cover has been secured in the manner described above, the cover may be stretched downwardly and forwardly about lower panel 22 to permit the tongue of the cover to be locked over spout 44 of the funnel, with the spout projecting through aperture 64.

Figure 2:
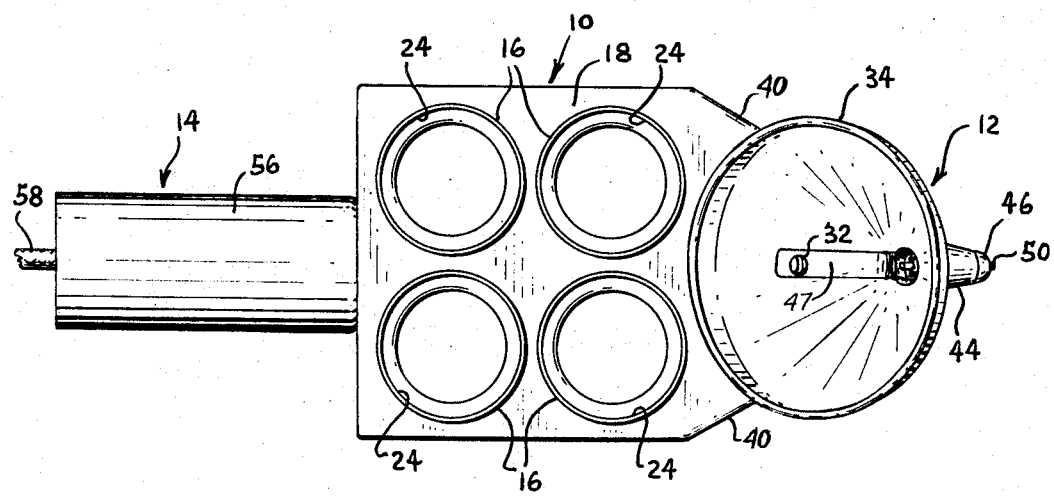
FIG. 2 is a top plan view of the tool shown in FIG. 1.

The art tool shown in FIGS. 1 and 2 is used by plugging the cord 58 into an electrical outlet and placing the desired colored waxes in the cups 16 and funnel pen 12 where they are melted. The palette-and-pen of the present invention, therefore, provides an encaustic painting tool combining a molten wax-storing part and wax-applicating part with a small heating unit that serves both of these parts. With this versatile art tool, small bits of crayon, candle wax or the like which are otherwise wasted, can be salvaged by placing them either in the cups or in the funnel of the pen. A brush, dauber or other instrument is then used to transfer wax from the cups to the article being decorated, in a manner similar to the use of a regular artist's palette. When it is desired to draw continuous lines of molten wax, the funnel pen is employed. This allows the wax to be applied in a flowing liquid line which dries immedaitely, producing a slightly raised surface that is well suited for a variety of print techniques.

Where it is desired to provide a greater variety of colors and wax textures, or where several people may want to use the same palette, a modified version of the tool may be employed in which the writing or pan portion is omitted and additional melting cups are provided in the palette. An art tool of this nature is illustrated in FIGS. 4 and 5, which show a unit similar to that shown in FIGS. 1 and 2 in that the palette is again heated by a small iron 28' which extends between two rows of melting cups 16' supported in an apertured palette plate 18'. Plate 18' is bent downwardly and rearwardly under cups 16' to form a rest or stand 22' for the unit. Plate 18' is secured at the front of the palette to the tip 30' of iron 28' as before by a fastening screw 32'. In this illustration, two rows of four cups each are provided in the palette, but it will be appreciated that a greater or fewer number of cups may be provided without departing from the invention.

It will be noted that in both modifications of the invention herein disclosed, the heating element is fully concealed between the rows of melting cups 16, 16' and between the upper panels 18, 18' and the lower stands or rests 22, 22'. In each case the palette portion 10 is of course made of a good heat-conducting material such as steel, aluminum or copper, so that heat is rapidly transmitted from the heating element to the wax, both in the melting cups and in the writing pen where that element of the tool is used. The relatively large amount of heat-conducting surface area of the tool prevents the palette or palette-and-open combination, as the case may be, from becoming overheated, and the exposed surfaces do not become so hot as to be dangerous to touch. At the same time, sufficient heat is provided to melt the wax in the cups and pen portion of these tools using only a small-capacity heating unit for the purpose.

What is claimed is:

1. A palette for preparing wax for encaustic painting and the like, comprising in combination a plurality of cup-shaped containers for said wax, a holder for supporting said containers substantially in a common plane, a heating unit comprising a pencil-type soldering iron mounted on said holder for melting wax in said containers, said soldering iron having an insulated handle and an elongated heat-transmitting barrel, said containers and holder being mounted in direct heat-transferring contact with said barrel and being formed of good heat-conducting material to facilitate melting of wax disposed in said containers, said containers being arranged in rows and said holder comprising and upper panel having holes in which said containers are disposed and a lower panel extending below said containers in spaced relation thereto, said heat-transmitting barrel being disposed between the rows of containers and in contact therewith and between said upper and lower panels so as to be enclosed thereby, said barrel being in engagement along its full length with the underside of said upper panel, said soldering iron having a tip at the end of said barrel and fastening means passing through said tip to secure said holder thereon in direct heat-transferring contact therewith.

2. A combination palette-and-pen for preparing and applying wax for encaustic painting and the like, comprising in combination a palette including a plurality of cup-shaped containers for storing said wax and a holder for supporting said containers substantially in a common plane, a wax applicating pen supported by said holder and a heating unit having an elongated heat-transmitting member mounted below said holder and in direct heat-transferring contact with said holder and cups and with said pen, and an insulated handle mounted on said heating unit adjacent one end thereof, said pen being mounted adjacent the opposite end of said heating unit and comprising a funnel-shaped pen member, said pen member and said containers being formed of a good heat-conducting material to facilitate melting of the wax disposed therein.

3. A combination palette-and-pen as defined in claim 2, wherein said heating unit comprises a conventional pencil-type soldering iron, said elongated heat-transmitting member and said insulated handle comprising the barrel and handle, respectively, of said soldering iron, said soldering iron having a tip at the outer end of said barrel, said funnel-shaped pen member being fastened to said tip in heat-transferring relation thereto and said holder being confined between said pen member and handle on said barrel.

4. A combination palette-and-pen as defined in claim 3, wherein said pen is provided in its said funnel-shaped member with a projecting stylus an a wax flow control valve operated thereby, said valve being normally biased to prevent wax flow from said pen but opened upon contact of said stylus with a surface to be decorated.

5. A combination palette-and-pen as defined in claim 4, wherein said cup-shaped wax containers are arranged in two rows with said elongated heat-transmitting member located between said rows and in lateral contact with said containers.

6. A combination palette-and-pen as defined in claim 5, which further includes an insulating cover comprising sheet rubber stretched across the bottom of said holder between said insulated handle and said wax-applying pen.

References Cited

UNITED STATES PATENTS

| | | | |
|---|---|---|---|
| 1,007,188 | 10/1911 | Dickson | 120—116 |
| 1,346,902 | 7/1920 | Lindahl | 120—116 |
| 1,815,589 | 7/1931 | Saachy | 120—116 X |
| 2,078,650 | 4/1937 | Clark | 219—387 |
| 2,341,938 | 2/1944 | Mestitz | 219—231 |
| 2,428,996 | 10/1947 | Schworm | 219—428 |
| 2,730,608 | 1/1956 | Axelsson | 219—415 X |
| 2,731,539 | 1/1956 | Pavelka | 219—417 |
| 2,806,121 | 9/1957 | Sacker | 219—231 |

ANTHONY BARTIS, *Primary Examiner.*